March 21, 1967 — F. W. STEPHENSON — 3,309,731
METHOD FOR DEHEADING SHRIMP
Filed Aug. 30, 1965 — 3 Sheets-Sheet 1
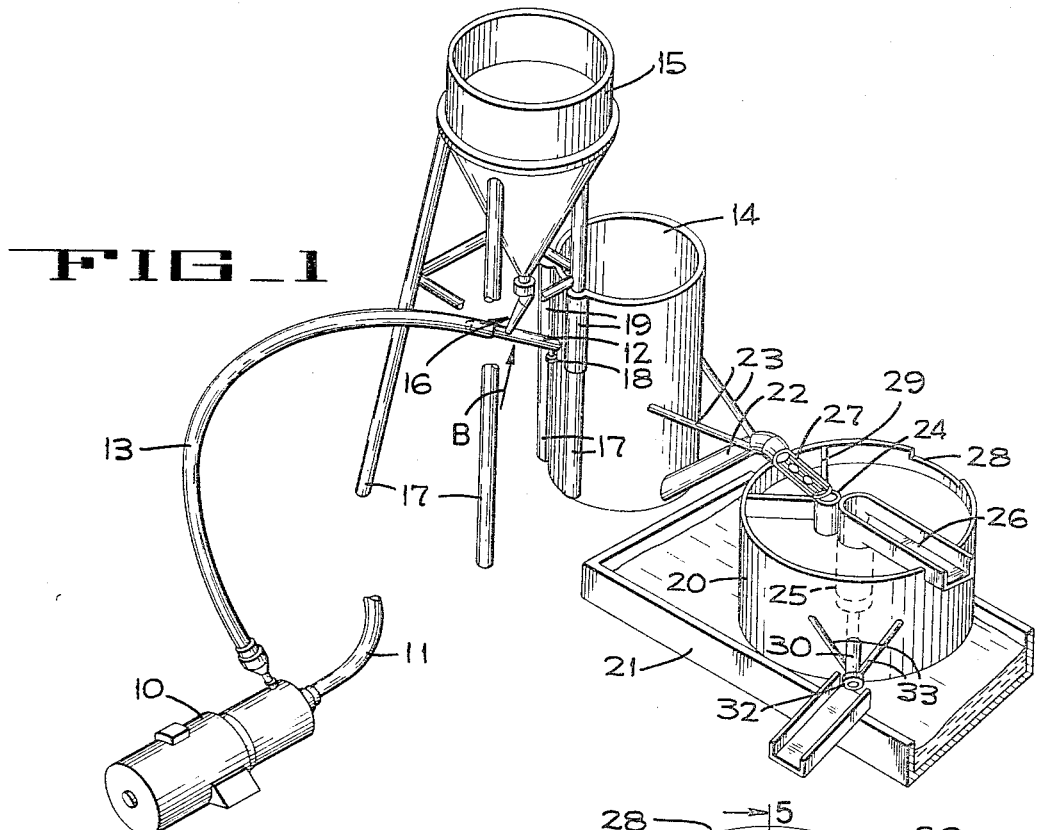
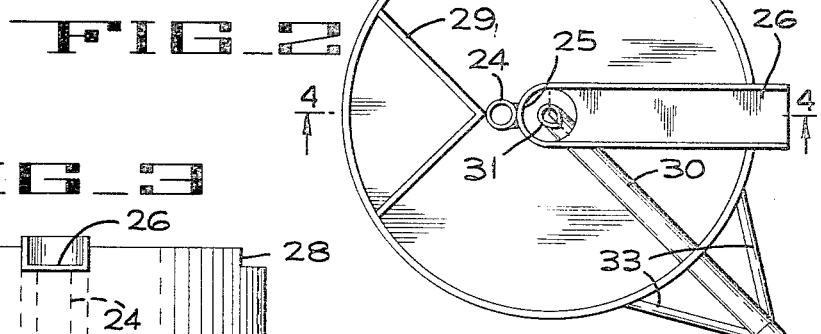
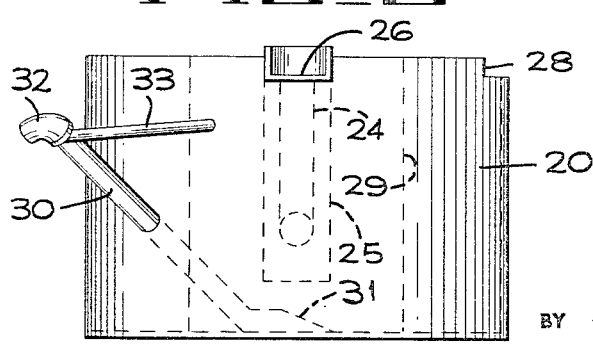
INVENTOR
FRED W. STEPHENSON
BY Hans G. Hoffmeister
ATTORNEY March 21, 1967  F. W. STEPHENSON  3,309,731
METHOD FOR DEHEADING SHRIMP
Filed Aug. 30, 1965  3 Sheets-Sheet 2
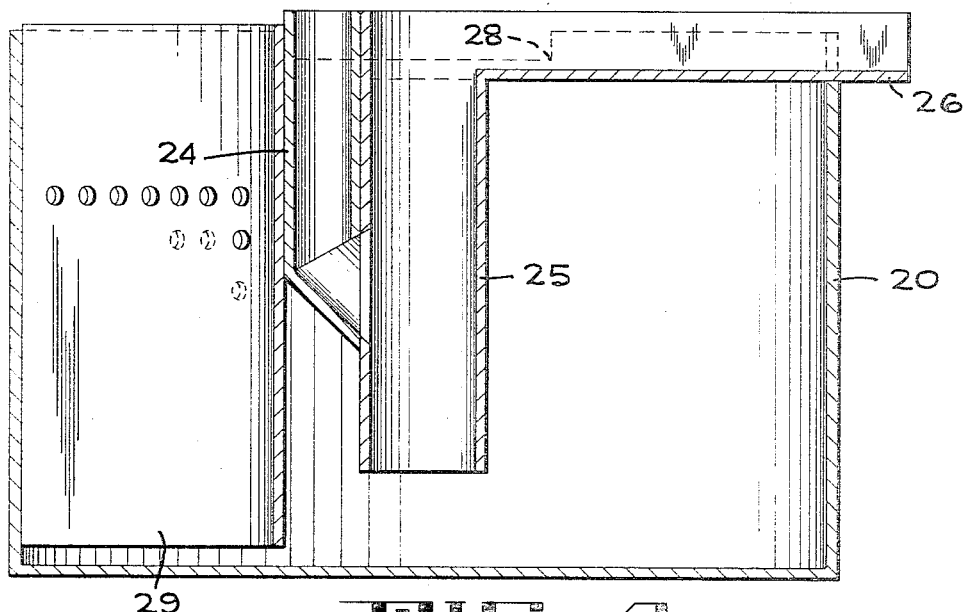
FIG_4
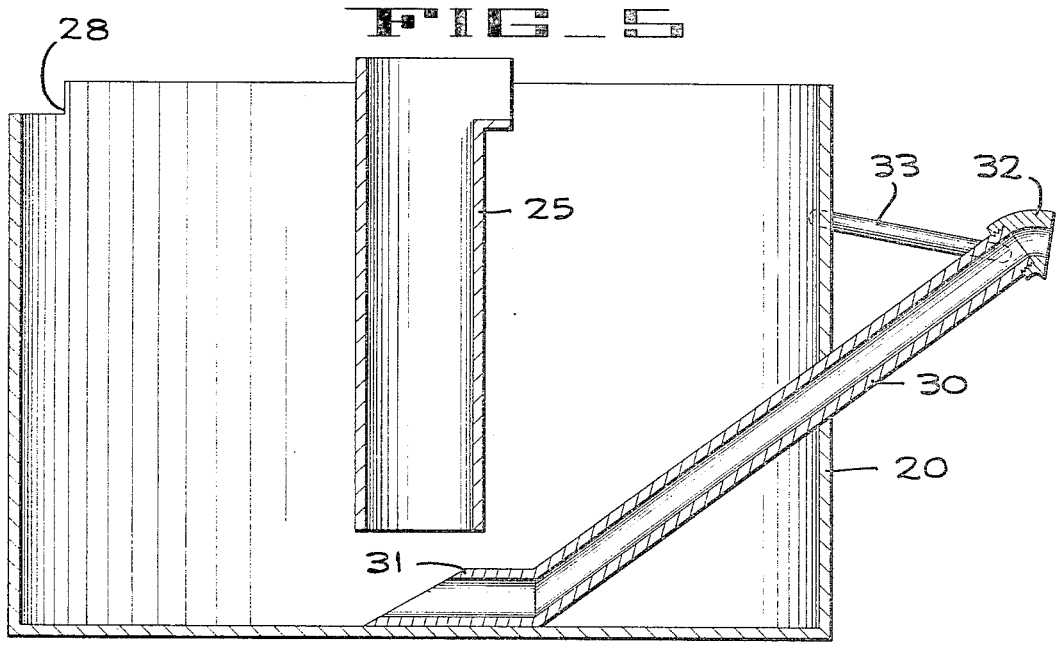
FIG_5
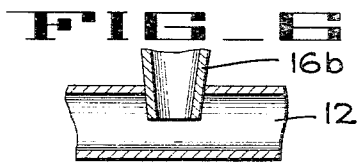
FIG_6
INVENTOR
FRED W. STEPHENSON
BY Hans G. Hoffmeister
ATTORNEY

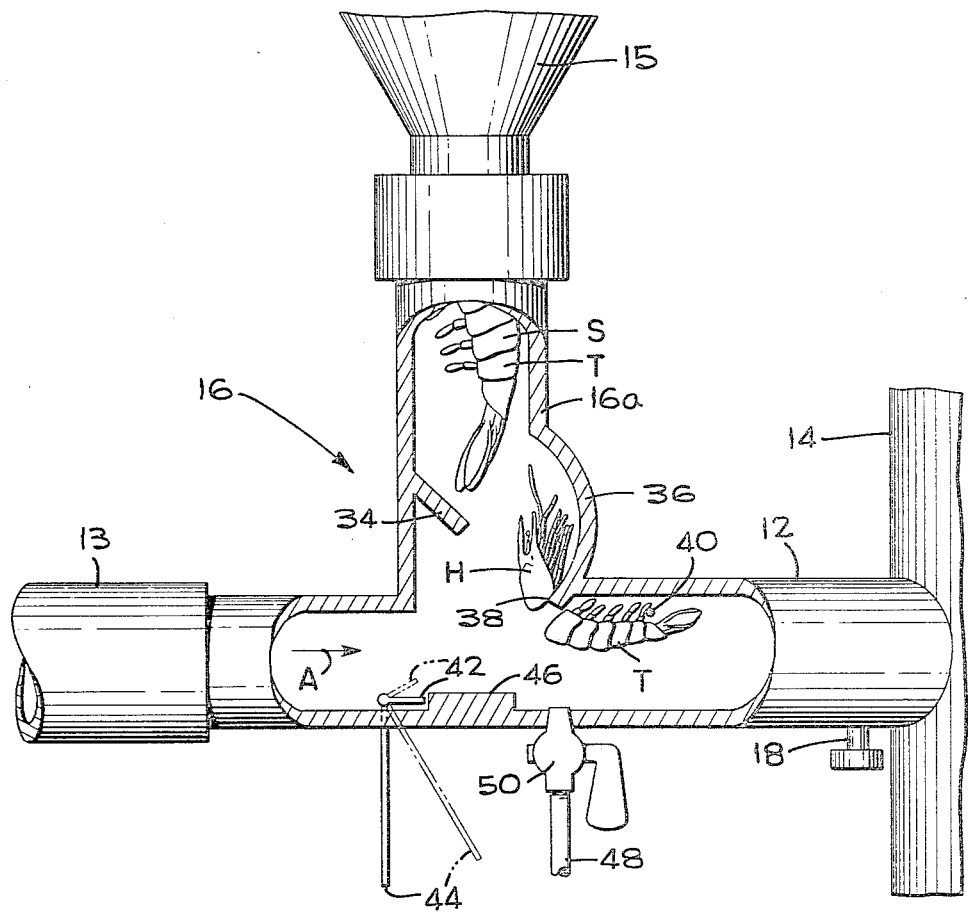
FIG_7

3,309,731
METHOD FOR DEHEADING SHRIMP
Fred W. Stephenson, 625 Margaret St.,
Key West, Fla. 33040
Filed Aug. 30, 1965, Ser. No. 483,732
7 Claims. (Cl. 17—45)

This application is a continuation-in-part of my earlier application Serial No. 342,634, filed February 5, 1964, now Patent No. 3,209,393, issued October 5, 1965.

This invention relates generally to a method for deheading fish and more particularly to a method for deheading shrimp and automatically separating the severed head from the remaining parts of the shrimp.

This invention is described in terms of deheading shrimp by way of example only and it should be understood that other fish can be deheaded by utilization of the device described herein without departing from the scope of the invention as defined by the claims.

The invention herein has as an object the provision of a method for separating the head of a shrimp from the body without handling.

Still a further object of the invention is to provide a method which will operate without critical conditions of operability and which can be operated under all environmental conditions including aboard ship.

The method of deheading shrimp embodying the invention is described herein with references to the drawings, in which:

FIGURE 1 is a perspective view of a device for deheading shrimp constructed in accordance with the teachings of this invention;

FIGURE 2 is a segmentary plan view of the separator portion of the device shown in FIGURE 1;

FIGURE 3 is a segmentary elevational view of the separator portion as viewed from the right in FIGURE 2;

FIGURE 4 is a partially sectional view on an enlarged scale taken along the line 4—4 in the direction of the arrows as indicated in FIGURE 2;

FIGURE 5 is a partially sectional view on an enlarged scale taken along the line 5—5 in the direction of the arrows as indicated in FIGURE 2;

FIGURE 6 is a partial sectional view on an enlarged scale taken substantially in the area indicated by the arrow B of FIGURE 1 illustrating one version of the shrimp deheading device; and FIGURE 7 is also a partial sectional view on a further enlarged scale and also taken substantially in the area indicated by the arrow B of FIGURE 1 illustrating another version of the shrimp deheading device and the manner in which the shrimp are deheaded.

In the figures, pump 10 is shown receiving water at input hose 11 and discharging it at a greatly increased high velocity head through nozzle 12 connected to output hose 13 into receiving tank 14.

Feeder tank 15 is connected by a velocity head connection 16 to nozzle 12 so that it can also discharge its contents, which are ejected into the high velocity flow of water of output hose 13, into receiving tank 14. As shown in FIGURE 7, the shrimp are fed partly by gravity to the nozzle 12 by a part 16a where, as will be explained in detail, the shrimp are deheaded. The feeder tank is supported by legs 17 above hose 13 for gravity feed therein and water is supplied to tank 15. The source of water supply to tank 15 can be a second output hose attached to pump 10 or any suitable source. Valve 18 is provided at nozzle 12 and the forward legs 17 which are supporting tank 15 are attached to tank 14 by brackets 19 to provide a spaced relationship and to maintain nozzle 12 projecting within the tank 14.

Separator tank 20 positioned in trough 21 is provided to receive the output of tank 14 through pipe 22 which connects with tank 14 near the bottom thereof and which opens over tank 20. Pipe 22 is inclined upwardly and maintained in position by struts 23 fastened to receiving tank 14.

The separator tank 20 includes a standpipe 24 which connects with separator pipe 25 about midway thereof. The separator pipe is large in diameter and disposed vertically with its lower end spaced above the bottom of tank 20 so that water injected into tank 20 by pipe 22, or any other suitable means, can flow upwardly within pipe 25 and out trough 26. Slide 27 bridges the space between pipe 22 and the upper open end of standpipe 24 and an overflow slot 28 is provided in the wall of tank 20.

Vertical perforated baffle 29 extends upwardly from a point above the bottom of tank 20 to approximately the upper termination of the tank wall with its apex adjacent standpipe 24 and its side edges adjacent the inner surface of the tank wall. The purpose of the baffle will become evident when the explanation of the operation of the device is considered below.

Evacuation pipe 30 projects through the side of tank 20 with its lower end 31 beneath separator pipe 25 and its upper end terminating outside of tank 20 at a level slightly beneath the water level in the tank which is maintained substantially constant due to overflow slot 28. In the figures the upper end of the suction pipe is indicated by the numeral 32 and the pipe is maintained at a proper angle by struts 33 fastened to tank 20. The overflow slot is above the level of the bottom of trough 26.

The version of the deheader shown in FIGURE 6 comprises a part 16b connected to the outlet of the tank 15, which projects into the stream of high velocity water and preferably at the point where the velocity is greatest. This point is at or near the center of the water stream. When the shrimp moving down the part 16b reach the high velocity stream of water, regardless of whether the head or the tail is first, the force of the stream is sufficient to separate the head from the tail when the juncture of these parts is substantially in the plane containing the end of the part 16b.

Referring to FIGURE 7 which shows another version of the deheading device on an enlarged scale, it will be seen that the shrimps are also gravitationally fed from the feeder tank 15 into the part 16a preferably with the tail section T extending downwardly. An inwardly and downwardly extending wall 34 is provided for directing the shrimp to an opposite arcuate wall portion 36 defining a breaker edge 38 whose function will be presently described. As each shrimp progresses downwardly in the part 16a, in the manner illustrated, the tail section T enters the nozzle 12 in which is flowing water conducted thereto from the pump 10 by the output hose 13. Such downward movement continues until the junction of the head H and the tail T is adjacent the edge 38 whereupon the tail is severed from the head due to the force of the water flowing in the direction of the arrow A. The head is then induced into the high velocity stream of water for delivery, together with the tail, to the receiving tank 14.

The present invention provides means, preferably a wire, in the nozzle 12 for removing the legs on the tail section of the shrimp before its introduction into the tank 14. Still referring to FIGURE 7 the wire, indicated by the numeral 40, is secured to the wall of the nozzle 12 to extend generally transversely across the flow path. The wire is also positioned above the center of the nozzle to allow enough space for the tail and head sections to pass to the tank 14. After the tail is separated from the head, the legs, which were associated with the tail, encounter the wire 40 which serves to remove these legs. Accordingly, the velocity head connection 16 is not only effective to dehead the shrimp but also to remove the legs from the tail of each shrimp before being conveyed to the tank 14.

At the intersection of the vertical part 16a and the nozzle 12 close nesting or bridging of the shrimp occasionally occurs thereby interrupting the deheading operation. Such a condition is easily and quickly corrected by providing a novel swinging deflector plate 42 which directs the high velocity water moving in the direction of the arrow A upwardly to the lower end of the part 16a. As shown in FIGURE 7 this device comprises a plate 42 extending transversely to the direction of water flow and located closely adjacent the bottom surface of the nozzle 12. The plate is pivotally connected to the wall of nozzle 12 by a shaft portion that extends outwardly through the wall and is rigidly secured to an operating handle 44. By moving the handle in a counterclockwise direction, as viewed in FIGURE 7, the plate and the handle can be made to assume the position shown in phantom outline. In this position the stream of water is directed to the intersection of the part 16a and the nozzle 12, where such nesting or bridging of the shrimp might occur and, accordingly, the force of the water stream is effective to loosen the shrimp and allow normal operation of the deheader.

On the lower surface of the nozzle 12, and in the projected area of the part 16a, a plate 46 is rigidly connected, serving the purpose of reducing the area and increasing the velocity of the water in this section of the nozzle so that a sufficient dynamic force is available for severing the tail from the head.

The reduction in area produced by the plate 46 has the effect of producing a rapid increase in velocity thus accelerating the tail immediately after it is severed. It may be desired to reduce the degree of acceleration and for this purpose air under pressure is admitted to the downstream side of the plate 46 by a conduit 48 connected to a suitable valve 50. Air introduced at the point has the effect of disturbing the venturi by creating a turbulent condition which dissipates the energy of the stream of water. Not only is the speed, at which the particles of shrimp (the head and the tail) move, reduced in the nozzle 12 but the downward speed in the part 16a is also reduced. Accordingly, the rate of processing can be adjusted to meet various requirements.

The practice of the method and operation of the apparatus will now be described. The device and method removes and disposes of the heads of shrimp from the tails and is basically a continuous flow device having no moving parts in the unit which actually heads the shrimp and separates the head from the body. The shrimp are dropped into hopper 15 which is filled with water, or continually filled with water, and, as shown in FIGURES 6 and 7 are conducted down by gravity to velocity head connection 16 through which water is being forced at a high velocity under pressure by the pump 10. The mixture of heads, tails and water is released through nozzle 12 into tank 14 from which they are forced upwardly through pipe 22 due to the continuing influx of water under velocity head from nozzle 12 into tank 14. The flow of water out of tank 14 through pipe 22 pulls the tails and heads at a rate of speed much higher than either heads or tails sink so they are virtually sucked out of the bottom of the tank. The water level in tank 14 is quite a distance above the outlet (or top) of pipe 22 due to the large volume of water introduced by nozzle 12, aiding the high rate of flow through the pipe.

The principle of operation of the separator is based on the fact that the tails sink faster than the heads in water. The mixed heads and tails are fed onto slide 27 which empties into the standpipe 24.

A portion of the water ejected from pipe 22 overflows the slide 27 and drops into the tank 20 behind baffle 29. The mixed heads and tails within standpipe 24 empty into separator pipe 25 through which water is flowing upwardly and out trough 26. This water flows up at a constant rate which is faster than the heads can sink but slower than the tails sink, therefore, the heads are carried up and out the trough and the tails sink to the bottom. In order to maintain a constant rate of flow through this separator pipe it is placed in the large tank 20 in which the water level is substantially constant so that there is substantially constant flow up the pipe and out the trough. The supply of water is always more than sufficient so that there is always some overflow. When the tails fall to the bottom of the tank they are removed by pipe 30 which goes up through the side of the tank. The perforated baffle 29 is used to diminish turbulence.

Thus it is seen that no handling is required; there are no moving parts with the exception of the pump, and the shrimp can be fed at random into the device. It is the sudden entrance of the shrimp into the high velocity stream which accomplishes the separation of heads from tails and it does not matter whether the head or tail enters the stream first. The device is simple to operate, the method is easy to practice and the unit can be operated under substantially all environmental conditions.

Thus, among others, the several objects in the invention as specifically aforenoted, are achieved. Obviously, numerous changes in construction and rearrangement of parts might be resorted to without departing from the spirit of the invention as defined by the claims.

I claim:

1. A method of deheading fish comprising the steps of positioning the fish so that the head or the body portion extends into a stream of high velocity fluid, supporting the juncture of such portions adjacent the edge of a stationary member, and exerting the force of the high velocity stream on one of such portions while the said juncture is supported to cause separation of such portions.

2. A method of deheading shrimp comprising the steps of positioning the shrimp so that the head or the tail portion extends into a stream of high velocity fluid, locating the juncture of such portions in contact with the edge of a stationary member, and exerting the force of the high velocity stream on the portion in such stream while the said juncture is supported to cause separation of such portions at the mentioned juncture.

3. A method of deheading shrimp comprising the steps of positioning the shrimp so that the head or the tail portion extends into a stream of high velocity fluid, locating the juncture of such portions in contact with the edge of a stationary member whereupon the force imparted to the portion in such stream is sufficient to cause separation of such portion at the mentioned juncture, and engaging the severed tail portion while it is being propelled by such stream with wire to thereby remove appendages from the tail.

4. A method of deheading shrimp comprising the steps of positioning the shrimp so that the head or the tail portion extends into a stream of high velocity fluid, separating such portions when the juncture thereof is located approximately at the edge of a rigid wall whereupon the force derived from such stream causes bending of the portion in the high velocity stream at the juncture of such portions with such bending being sufficient to separate such portions, and removing the legs attached to the tail by passing the tail past a scraper while it is being propelled by the high velocity stream.

5. A shrimp deheading method comprising the steps of introducing shrimp in a selected orientation while immersed in a stream of low velocity fluid to an intersecting stream of high velocity fluid, deflecting the oriented shrimp toward a wall terminating at the intersection of such streams, and separating the head and tail portions of such shrimp by the force of the high velocity stream when the juncture of such portions is located approximately at the termination of such wall.

6. A shrimp deheading method comprising the steps of introducing shrimp in a selected orientation while immersed in a stream of low velocity fluid to an intersecting stream of high velocity fluid, deflecting the oriented shrimp toward a wall terminating at the intersection of such streams, separating the head and tail portions of such shrimp by the force of the high velocity stream when the juncture of such portions is located approximately at the termination of such wall, and removing the legs from the tail by passing it past a stationary scraper while being propelled by the stream of high velocity fluid.

7. A method of processing shrimp which includes separating the head from the tail, removal of the leg from the tail and segregating the head and tails for separate collection, said method comprising deflecting the oriented shrimp toward a wall terminating at the intersection of such streams, separating the head and tail portions of such shrimp by the force of the high velocity stream when the juncture of such portions is located at the termination of such wall, engaging the legs of the tail portion with a member being effective to remove the legs while the tail is being propelled by the stream, and segregating the heads and tails by discharging the stream of high velocity fluid containing the separated head and tails into an upwardly flowing stream of liquid having a velocity which is sufficient to cause upward movement of the heads and allow downward gravitational flow of the tails whereupon devices are provided for separately collecting the head and tails.

References Cited by the Examiner
UNITED STATES PATENTS

| | | | |
|---|---|---|---|
| 2,491,778 | 12/1949 | Smith | 17—4 |
| 2,534,767 | 12/1950 | Greiner et al. | 17—45 |
| 2,663,900 | 12/1953 | Greiner et al. | 17—45 |
| 2,794,209 | 6/1957 | Self | 17—2 |

LUCIE H. LAUDENSLAGER, *Primary Examiner.*

SAMUEL KOREN, *Examiner.*